United States Patent
Lu

[11] Patent Number: 6,003,437
[45] Date of Patent: Dec. 21, 1999

[54] APPARATUS FOR MAKING NOODLES

[75] Inventor: Yao-Kai Lu, Tainan, Taiwan

[73] Assignee: Chine Lee Industrial Co., Ltd., Tainan, Taiwan

[21] Appl. No.: 09/286,526

[22] Filed: Apr. 5, 1999

[30] Foreign Application Priority Data

| Apr. 13, 1998 | [TW] | Taiwan | 87205526 |
| Apr. 24, 1998 | [CN] | China | 98204035 |
| May 15, 1998 | [MY] | Malaysia | 9802189 |

[51] Int. Cl.[6] ............. A21C 3/04; A21C 11/16; B29B 1/06; B01F 7/18
[52] U.S. Cl. ............. 99/450.2; 99/353; 425/190; 425/204
[58] Field of Search ............. 99/348, 353, 450.1–450.8, 99/494; 366/98, 99, 309, 314, 319, 77, 87, 196; 425/191, 190, 307, 194, 197, 204, 205, 294, 336, 185, 135, 367, 376.1, 363, 464, 466; 426/502, 504, 509, 516, 451, 557; D7/376, 368

[56] References Cited

U.S. PATENT DOCUMENTS

| 4,057,377 | 11/1977 | Sakurazawa | 425/135 |
| 4,083,668 | 4/1978 | Bardwick, III et al. | 425/307 X |
| 4,360,332 | 11/1982 | Cyin | 99/353 X |
| 4,415,323 | 11/1983 | Osrow et al. | 425/190 X |
| 4,971,546 | 11/1990 | Cimenti | 426/502 X |
| 5,393,212 | 2/1995 | Tahano | 425/204 X |
| 5,393,217 | 2/1995 | Cheng | 99/348 X |
| 5,401,159 | 3/1995 | Hsu | 99/353 X |
| 5,402,715 | 4/1995 | Kurachi et al. | 99/450.2 |
| 5,409,365 | 4/1995 | Su et al. | 99/353 X |
| 5,410,952 | 5/1995 | Liou | 99/450.2 X |
| 5,460,506 | 10/1995 | Price, IV et al. | 99/353 X |
| 5,486,100 | 1/1996 | Hus | 99/353 X |

*Primary Examiner*—Timothy Simone
*Attorney, Agent, or Firm*—Christensen O'Connor Johnson & Kindness PLLC

[57] ABSTRACT

An apparatus for making noodles includes a casing, a rolling unit mounted on the casing for flattening a mass of dough into a flat piece of dough, a cutting unit mounted on the casing for cutting the flat piece of dough into strands of noodles, a drive unit for driving operably the rolling unit and the cutting unit, a guiding unit for guiding the flat piece of dough into the cutting unit, and an adjustment unit. The rolling unit includes a cylindrical first roller and a cylindrical second roller parallel to and spaced apart from the first roller. The first and second rollers permit passage of the mass of dough therebetween. The rolling unit further includes a first shaft connected fixedly and coaxially to the first roller, and a second shaft extending axially and rotatably through the second roller. The first shaft is coupled to and is driven rotatably by the drive unit. The rolling unit further includes a drive gear coupled to the first shaft, and a follower gear coupled to the second roller and engaging the drive gear, thereby permitting simultaneous rotation of the first and second rollers in opposite directions. The adjustment unit is operable for adjusting distance between the first and second shafts.

13 Claims, 6 Drawing Sheets

APPARATUS FOR MAKING NOODLES

BACKGROUND OF THE INVENTION

1. Field of the Invention

This invention relates to an apparatus for making noodles, more particularly to a noodle-making apparatus which includes a rolling unit for flattening a mass of dough into a flat piece of dough and a cutting unit disposed below the rolling unit for cutting the flat piece of dough into strands of noodles.

2. Description of the Related Art

A conventional noodle-making apparatus generally includes a kneading unit and a rolling unit. To make noodles, predetermined amounts of flour and water are poured into a kneading chamber of the kneading unit for thorough mixing to form a mass of dough, which is then removed from the kneading chamber and passed through the rolling unit for flattening so as to result in a flat piece of dough. Thereafter, the rolling unit is detached from the apparatus for replacement with a cutting unit. The flat piece of dough is subsequently fed into the apparatus for cutting into strands of noodles by the cutting unit. However, since a replacement procedure is required, it is somewhat complicated and inconvenient to make noodles with the use of the aforementioned noodle-making apparatus. In addition, although the rolling unit of the conventional noodle-making apparatus may incorporate adjustment means for adjusting thickness of the flat piece of dough, the adjustment means permits only finite adjustment of the thickness in a limited range and is easily damaged when a large-sized mass of dough passes through the rolling unit. The conventional noodle-making apparatus is thus not satisfactory.

SUMMARY OF THE INVENTION

The main object of the present invention is to provide a noodle-making apparatus which is provided with a rolling unit and a cutting unit and which has an adjustment unit that permits infinite adjustment of the thickness of the flattened dough in a limited range.

Accordingly, the apparatus of this invention includes a casing, a rolling unit mounted on the casing for flattening a mass of dough into a flat piece of dough, a cutting unit mounted on the casing and disposed below the rolling unit for cutting the flat piece of dough into strands of noodles, a drive unit for driving operably the rolling unit and the cutting unit, and a guiding unit disposed between the rolling unit and the cutting unit for guiding the flat piece of dough into the cutting unit. The casing is formed with an opening between the cutting unit and the rolling unit such that the flat piece of dough can be pulled out of the casing via the opening without passing through the cutting unit. The rolling unit includes a cylindrical first roller and a cylindrical second roller parallel to and spaced apart from the first roller. The first and second rollers permit passage of the mass of dough therebetween. The rolling unit further includes a first shaft connected fixedly and coaxially to the first roller, and a second shaft extending axially and rotatably through the second roller. The first shaft is coupled to and is driven rotatably by the drive unit. The rolling unit further includes a drive gear coupled to the first shaft, and a follower gear coupled to the second roller and engaging the drive gear, thereby permitting simultaneous rotation of the first and second rollers in opposite directions. The rolling unit further has an adjustment unit for adjusting distance between the second shaft and the first shaft. The adjustment unit includes an eccentric pin that is fixed to the second shaft and that extends axially and eccentrically from one end of the second shaft, a rotary knob disposed outwardly of the casing and secured to the eccentric pin, the rotary knob being operable for rotating the eccentric pin, and a ratchet and pawl unit mounted on the casing and coupled to the eccentric pin. The ratchet and pawl unit permits rotation of the eccentric pin in a first direction so as to move the second roller toward and away from the first roller for adjusting the distance between the second shaft and the first shaft. The ratchet and pawl unit prevents rotation of the eccentric pin in a second direction opposite to the first direction so as to retain the second shaft at the adjusted distance from the first shaft. The cutting unit includes a parallel pair of cutting rollers formed with alternate annular protrusions and annular grooves.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
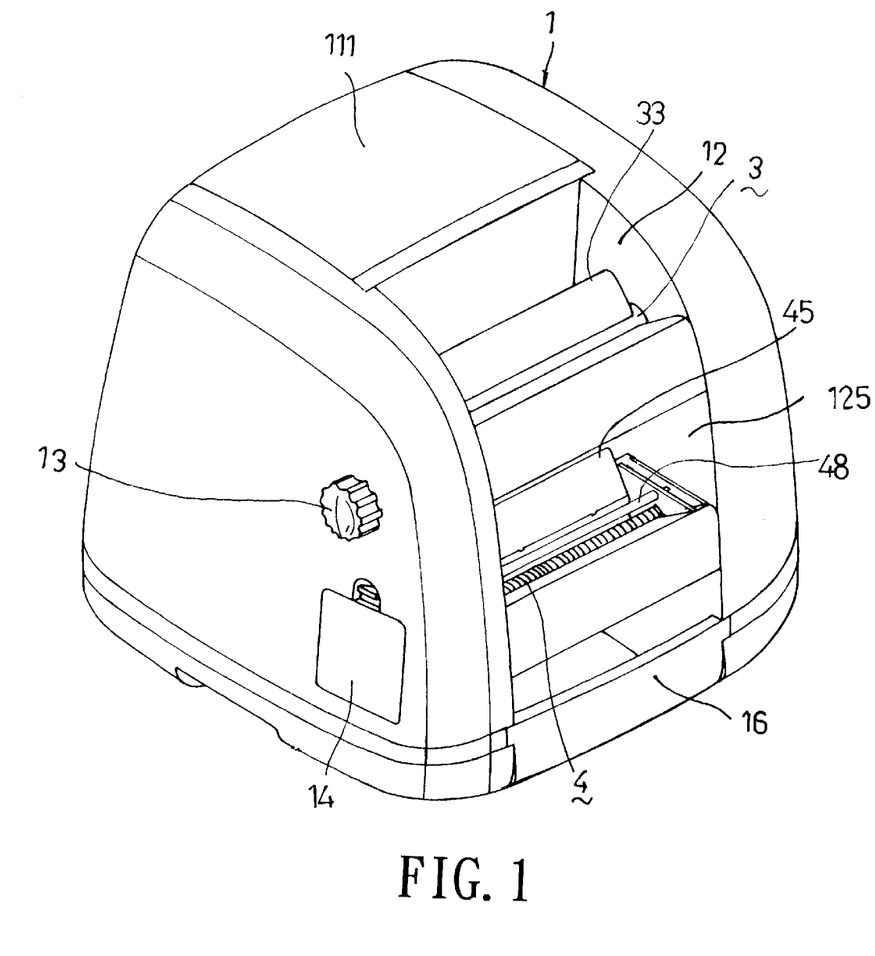
FIG. 1 is a perspective view of the preferred embodiment of an apparatus for making noodles according to the present invention.
Figure 2:
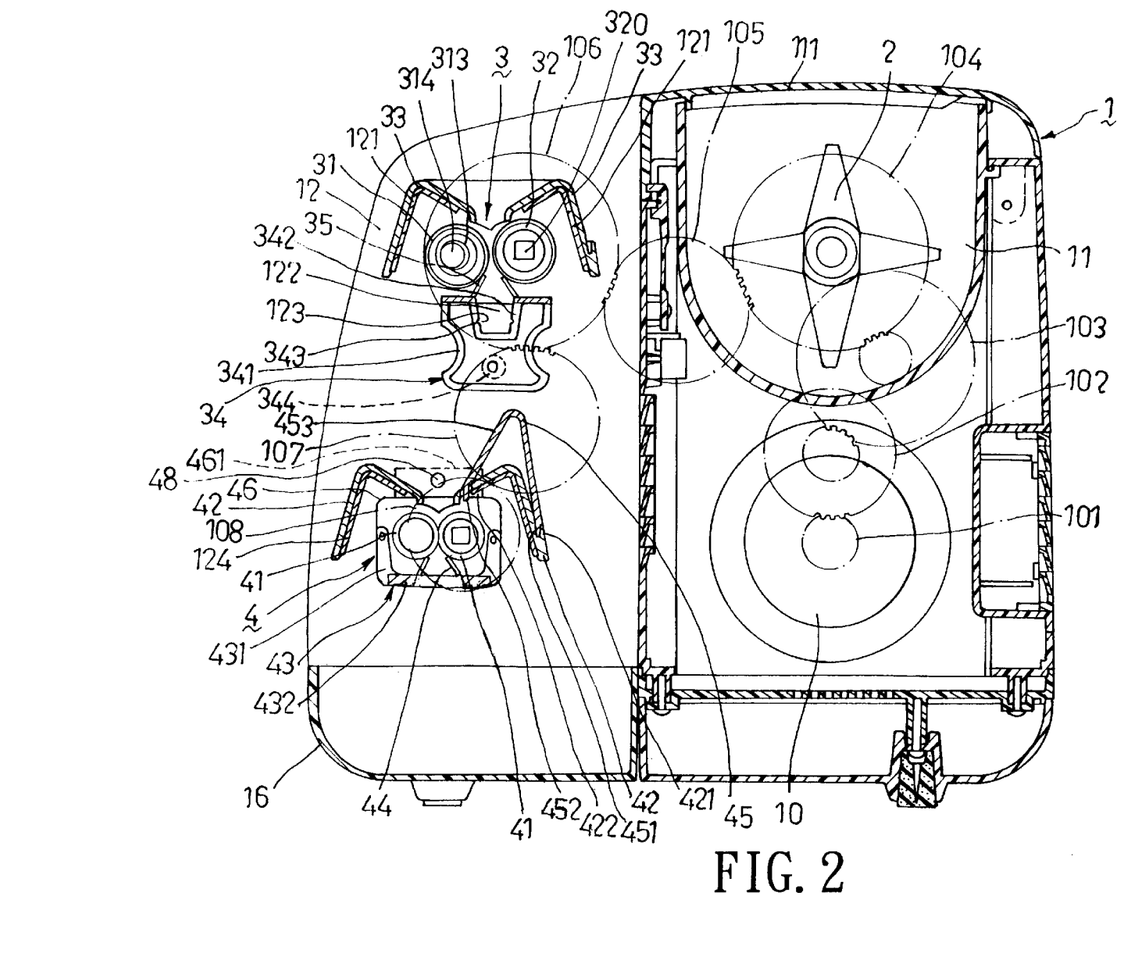
FIG. 2 is a sectional side view of the preferred embodiment viewed from a right side of FIG. 1.

Referring to FIGS. 1 and 2, the apparatus of the preferred embodiment according to the present invention includes a casing 1 which has a motor 10 mounted therein and which is formed with a kneading chamber 11 above the motor 10. A cover 111 is provided for covering an upper side of the chamber 11, and a kneading unit 2 is mounted within the chamber 11. The casing 1 has a front part formed with spaced apart side walls 12. A rolling unit 3 and a cutting unit 4 are disposed between and are mounted on the side walls 12. The cutting unit 4 is disposed between the rolling unit 3. The front part of the casing 1 is formed with an opening 125 between the rolling unit 3 and the cutting unit 4 and between the side walls 12. The kneading unit 2, the rolling unit 3 and the cutting unit 4 are driven by the motor 10 via a plurality of transmission gears 101 to 108. To make noodles, predetermined amounts of flour and water are disposed in the chamber 11 for kneading by the kneading unit 2, thereby resulting in a mass of dough. Thereafter, the mass of dough is removed from the chamber 11 and is fed into the rolling unit 3 for flattening to result in a flat piece of dough, which can be guided downwardly to the cutting unit 4 below the rolling unit 3 for cutting the same into strands of noodles. The noodles are received in a noodle receiver 16 which is disposed immediately below the cutting unit 4. When a flat piece of dough, rather than noodles, is to be made, the flat piece of dough can be pulled out of the casing 1 via the opening 125 without passing through the cutting unit 4.

Figure 3:
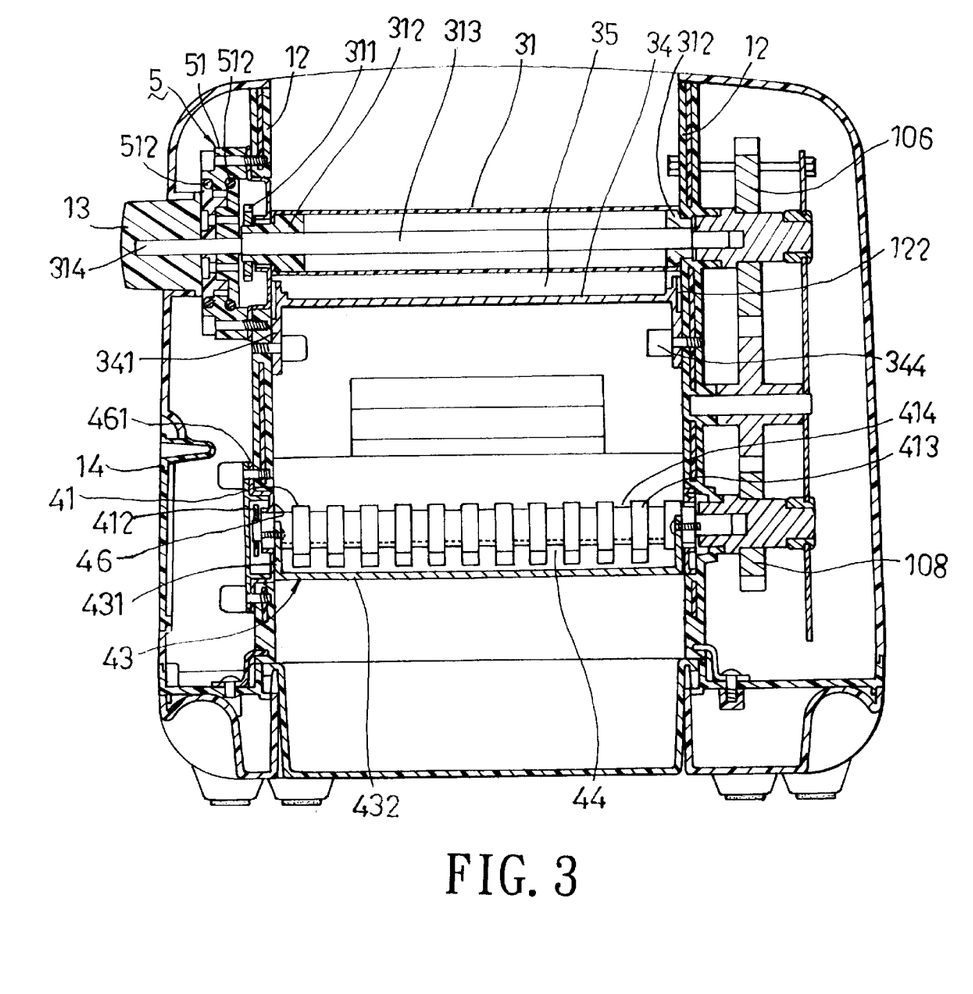
FIG. 3 is another sectional view of the preferred embodiment viewed from a front side of FIG. 1.
Figure 4:
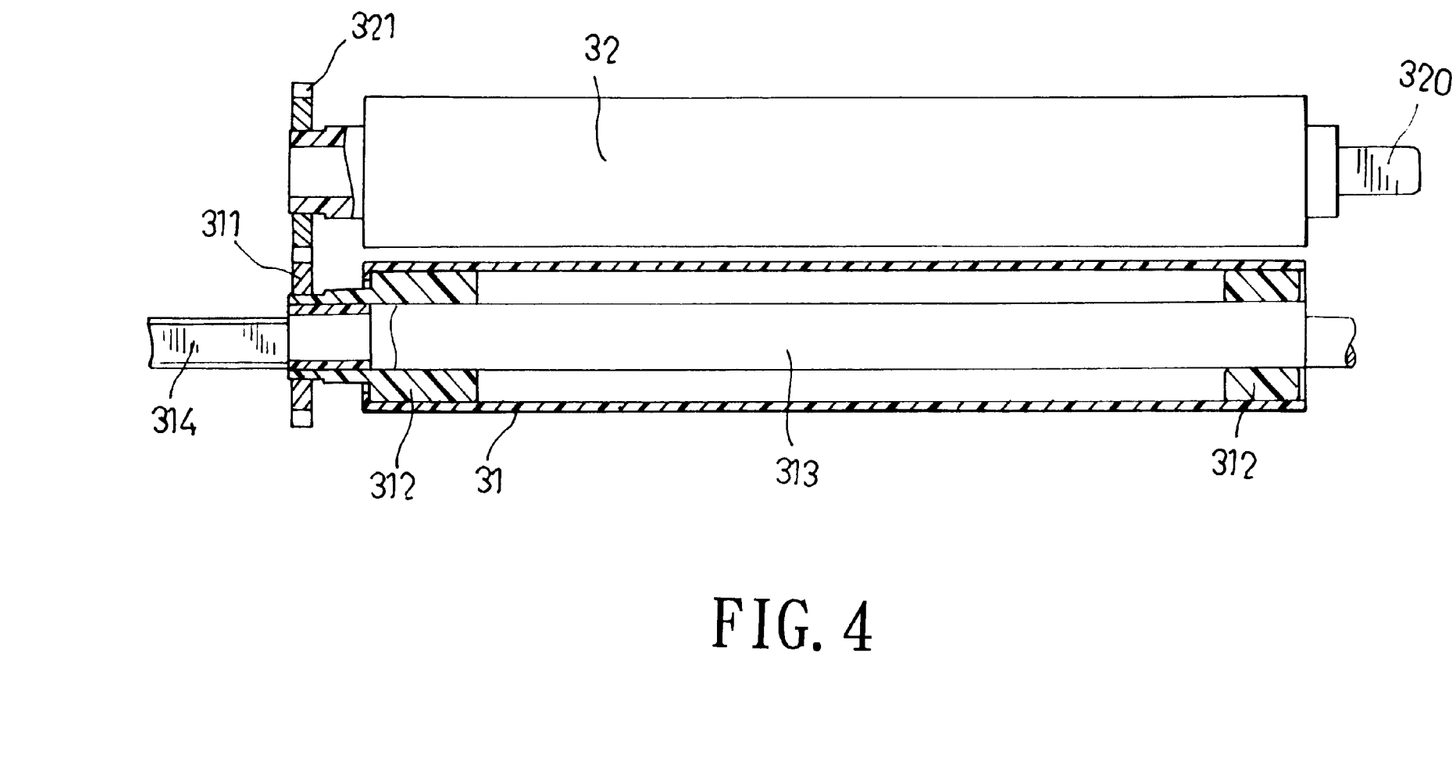
FIG. 4 is a sectional, schematic view from a top side, illustrating a rolling unit of the preferred embodiment.

Referring to FIGS. 2 to 4, the rolling unit 3 includes an elongated cylindrical first roller 32 and an elongated cylindrical second roller 31 parallel to the first roller 32. The second roller 31 is in front of and is spaced apart from the first roller 32. The first roller 32 and the second roller 31 are disposed between the side walls 12. A first shaft 320, which has a rectangular cross-section, is connected fixedly and coaxially to the first roller 32, and is coupled to the transmission gear 106 so as to be driven by the motor 10. The first shaft 320 has a drive gear 321 sleeved fixedly thereon. The second roller 31 has a second shaft 313 extending axially therethrough. Two bearing rings 312 are sleeved rotatably on the second shaft 313 and are fixed to the second roller 31 so as to couple the second shaft 313 rotatably to the second roller 31. That is, axial rotation of the second roller 31 is permitted independently of and relative to the second shaft 313. One of the bearing rings 312 has a follower gear 311 sleeved fixedly thereon. The follower gear 311 engages the drive gear 321 so as to permit rotation of the first roller 32 to be transmitted to the second roller 31 so that the first and second rollers 32, 31 are rotatable simultaneously in opposite directions for rolling a mass of dough that passes therebetween. The second shaft 313 has an eccentric pin 314 connected fixedly to one end thereof. The eccentric pin 314 extends axially and eccentrically from an end face of said one end of the second shaft 313. The eccentric pin 314 extends through a ratchet and pawl unit 5 mounted on the casing 1, and is secured to a rotary knob 13 that is disposed outwardly of the casing 1. The rotary knob 13 is operable to cause axial rotation of the eccentric pin 314. Preferably, the eccentric pin 314 has a non-circular cross-section. The eccentric pin 314, the ratchet and pawl unit 5, and the rotary knob 13 cooperatively constitute an adjustment unit for adjusting thickness of the flat piece of dough that exits the rolling unit 3.

Figure 5:
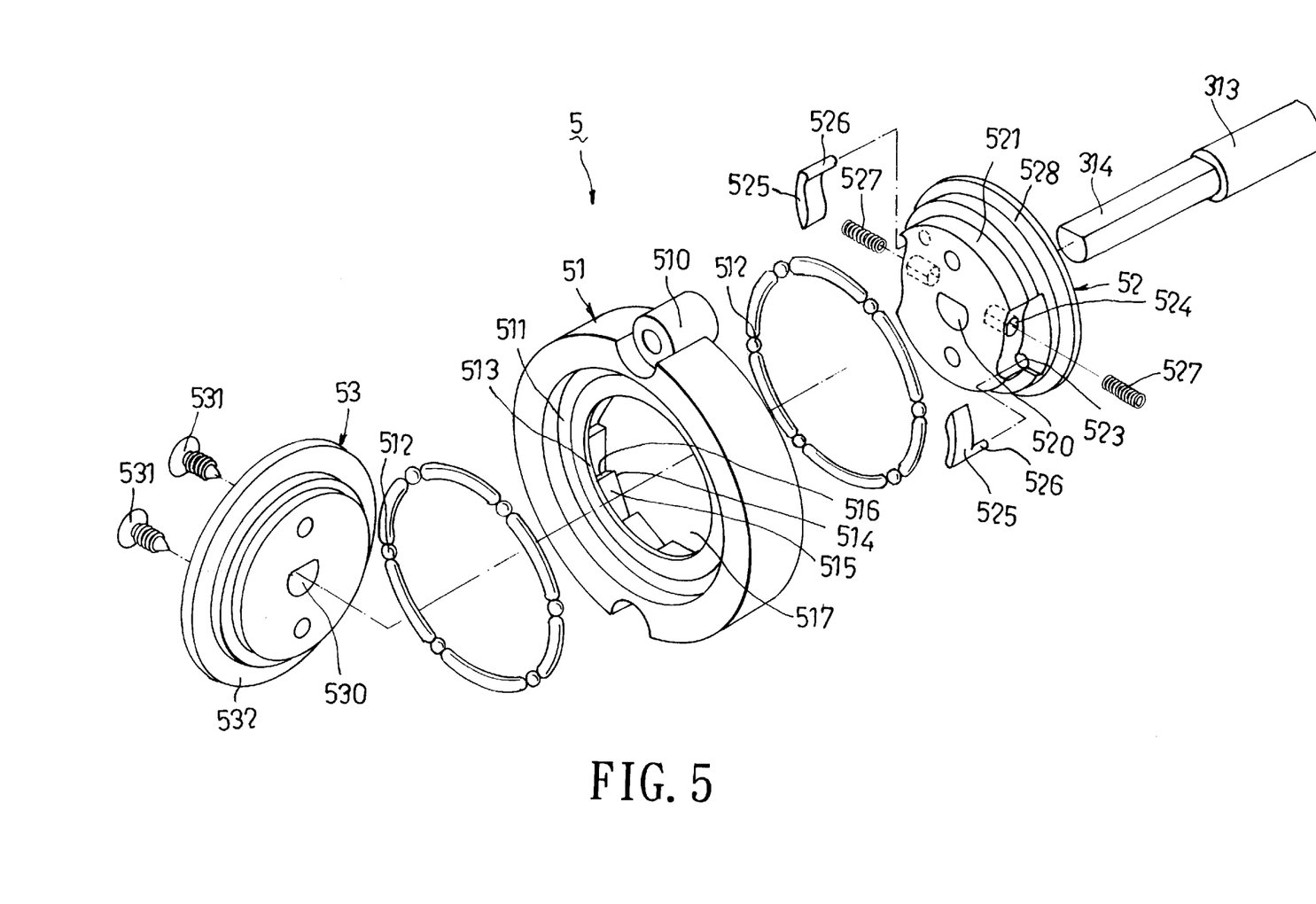
FIG. 5 is an exploded perspective view illustrating a ratchet and pawl unit of the apparatus of the preferred embodiment.
Figure 6:
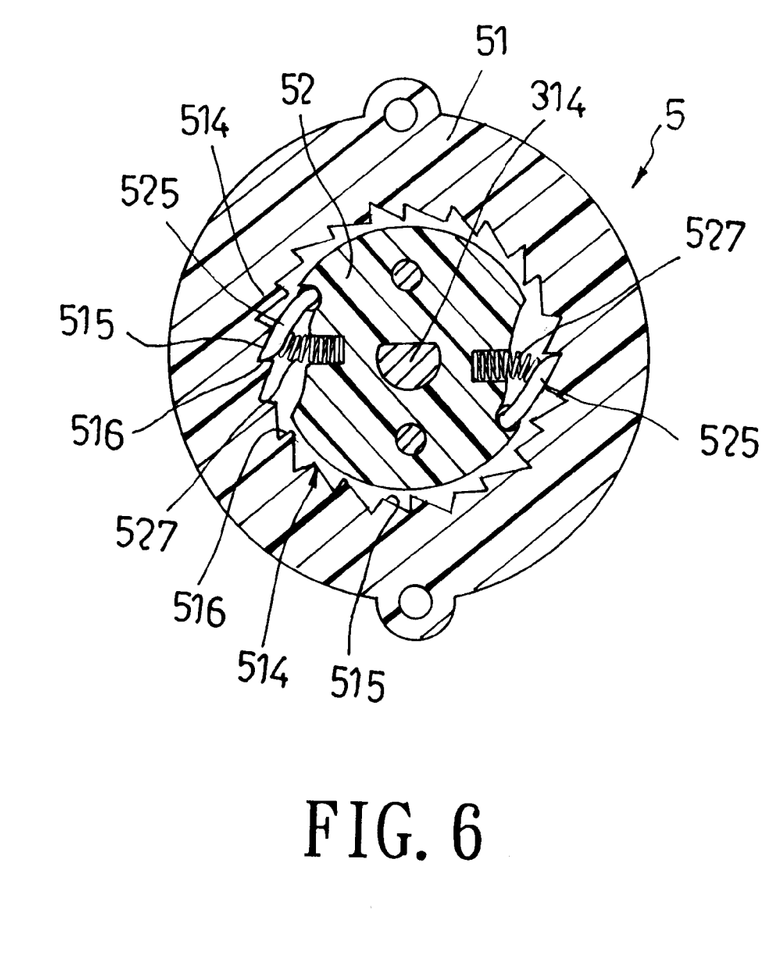
FIG. 6 is a cross-sectional view of the ratchet and pawl unit.

Referring to FIGS. 3 and 5, the ratchet and pawl unit 5 includes an annular stationary seat 51, a rotary seat 52 and a cap 53. The stationary seat 51 is formed with a fastening post 510 which is fastened to one of the side walls 12. The stationary seat 51 has an annular inner peripheral surface 513 that confines an opening 517 to permit extension of the eccentric pin 314 therethrough, and two opposite end faces, each of which is formed with an annular groove 511 around the opening 517 for receiving a bearing unit 512 therein. The inner peripheral surface 513 is formed with a plurality of ratchet teeth 514 therealong. Each of the ratchet teeth 514 is defined by an inclined face 515 and a straight face 516 which is substantially perpendicular to the inner peripheral surface 513. The rotary seat 52 has a non-circular central hole 520 aligned with the opening 517 and having a shape corresponding to the cross-section of the eccentric pin 314 so as to permit extension of the eccentric pin 314 therethrough and so as to couple non-rotatably with the eccentric pin 314. The rotary seat 52 is disposed between the stationary seat 51 and the second roller 31, and is formed with a circular flange 528 which covers the ball retaining groove 511 on an adjacent one of the end faces of the stationary seat 51 and which is in contact with the bearing unit 512 received in the adjacent annular groove 511. The rotary seat 52 has a raised portion 521 extending into the opening 517, and an outer periphery surrounded by the inner peripheral surface 513 of the stationary seat 51. Referring to FIGS. 5 and 6, the rotary seat 52 is formed with two opposite radial spring recesses 524 in the raised portion 521 for mounting two springs 527 therein such that the springs 527 extend radially from the raised portions 521. The rotary seat 52 is further formed with two opposite pivot holes 523 for mounting two pawl members 525 thereat. Each of the pawl members 525 has a leg 526 extending rotatably into the respective one of the pivot holes 523, and has a tip portion biased in a radial outward direction by a respective one of the springs 527 to engage releasably the ratchet teeth 514 of the stationary seat 51. The cap 53 is disposed between the stationary seat 51 and the rotary knob 13 (see FIG. 3), and is formed with a non-circular central hole 530 which is aligned with the central hole 520 of the rotary seat 52 for extension of the eccentric pin 314 therethrough. The cap 53 also has a flange portion 532 which covers the annular ball retaining groove 511 on an adjacent end face of the stationary seat 51 and which is in contact with the bearing unit 512 received in the adjacent annular groove 511. The cap 53 is fastened to the rotary seat 52 by means of screws 531.

In operation, the cap 53 and the rotary seat 52 are rotatable together with the eccentric pin 314 relative to the stationary seat 51, which is fixed to the casing 1. The bearing units 512 received in the annular grooves 511 facilitate rotation of the cap 53 and the rotary seat 52 relative to the stationary seat 51. When the rotary knob 13 is operated to rotate the eccentric pin 314 in a clockwise direction so as to move the second roller 31 (see FIG. 4) toward and away from the first roller 32 to adjust the distance between the first and second shafts 320, 313, the rotary seat 52 and the cap 53 are rotated in the clockwise direction together with the eccentric pin 314. As shown in FIG. 6, during rotation of the rotary seat 52 in the clockwise direction, the pawl members 525 disengage the ratchet teeth 514 and slide past the inclined faces 515 of the ratchet teeth 514. The springs 527 are intermittently and alternatingly compressed and released. As such, concomitant rotation of the eccentric pin 314, the rotary seat 52, the cap 53 and the rotary knob 13 (see FIG. 3) in the clockwise direction is permitted.

When the rotary knob 13 is operated in order to rotate the eccentric pin 314 in a counter-clockwise direction, the pawl members 525 are biased by the springs 527 to abut against the straight faces 516 of the ratchet teeth 514, thereby preventing rotation of the rotary seat 52 and the eccentric pin 314 in the counter-clockwise direction. That is to say, the ratchet and pawl unit 5 permits rotation of the eccentric pin 314 in the clockwise direction in order to move the second roller 31 (see FIG. 4) toward and away from the first roller 32 to adjust the distance between the first and second shafts 320, 313, and prevents rotation of the eccentric pin 314 in the counter-clockwise direction in order to retain the second shaft 313 at the adjusted distance from the first shaft 320. This is especially helpful for positioning the second shaft 313 and the second roller 31 when a mass of dough of a relatively large size passes between the first and second rollers 32, 31.

Referring to FIGS. 1 and 2, a parallel pair of elongated upper cover plates 33 are disposed above the first and second rollers 32, 31, respectively, for covering top sides of the same. Each of the upper cover plates 33 has an inverted V-shaped cross-section and extends between the side walls 12. To mount the upper cover plates 33 on the side walls 12, each of the side walls 12 is formed with two protruding ribs 121 having inverted V-shaped cross-sections for supporting end portions of the upper cover plates 33. The upper cover plates 33 are thus easily removable from the casing 1 for cleaning purposes.

Referring to FIGS. 2 and 3, a first guiding unit 34 is mounted between the side walls 12 and below the first and second rollers 32, 31. The first guiding unit 34 includes a support frame 341 and two guiding plates 35 which extend upwardly and respectively to lower ends of the first and second rollers 32, 31 in order to guide the flat piece of dough downwardly and to prevent sticking of the flat piece of dough onto either of the rollers 32, 31. The support frame 341 has an upper part formed with two spaced, slightly inclined vertical walls 342 that incline downwardly in a direction toward each other and that have confronting sides formed with engaging grooves 343. Each of the side walls 12 of the casing 1 has a flat projection 122 that projects from the side wall 12 and that is formed with two engaging protrusions 123 for engaging resiliently the grooves 343. The support frame 341 further has a lower part fastened to the side walls 12 by means of screws 344. During assembly, the first guiding unit 34 is brought between the side walls 12 and below the flat projections 122, and is moved upwardly toward the flat projections 122 so that the flat projections 122 extend between the vertical walls 342 to engage the protrusions 123 within the grooves 343. Thereafter, the screw members 344 are extended through the support frame 341 for fastening the support frame 341 to the side walls 12. After using the apparatus, the first guiding unit 34 can be detached from the apparatus for cleaning by removing the screw members 344 and then pulling downwardly the support frame 341 to disengage from the flat projections 122.

The cutting unit 4 includes a mounting frame 46 mounted on the casing 1, and a parallel pair of cutting rollers 41 mounted on the mounting frame 46 and disposed below the rolling unit 3.

The mounting frame 46 is mounted on the side walls 12, and has a mounting plate 461 fastened to one of the side walls 12. The cutting rollers 41 are provided with gear members 412 which engage one another and which are driven by the motor 10 such that the cutting rollers 41 are rotatable simultaneously in opposite directions. Each of the cutting rollers 41 is formed with alternate annular protrusions 413 and annular grooves 414 in order to cut the flat piece of dough from the rolling unit 3 into strands of noodles.

A pair of lower cover plates 42 are disposed above the cutting rollers 41, respectively, for covering top sides of the same. The lower cover plates 42 also have inverted V-shaped cross-sections, and are supported on inverted V-shaped protruding ribs 124 formed on the side walls 12 of the casing 1 for mounting on the casing 1. A horizontal protecting rod 48 is provided between the lower cover plates 42 and above the cutting rollers 41 to protect the hand of the user from being hurt by the cutting rollers 41 when the hand is extended into the casing 1. A rear one of the lower cover plates 42 has an edge portion formed with a pair of engaging holes 422 and an opposite edge portion formed with an elongated groove 421.

A second guiding unit 43, which is provided below the cutting unit 4, has two opposite end portions 431 secured to the mounting frame 46, and a parallel pair of horizontal rails 432 extending between the end portions 431 and disposed immediately below the cutting rollers 41, respectively. Two rows of guiding plates 44 extend upwardly and respectively from the horizontal rails 432 into the annular grooves 414 of the cutting rollers 41 in order to guide the noodles downwardly and to prevent sticking of the noodles onto either one of the cutting rollers 41. The casing 1 has an outer side provided with a cap 14 for access to the cutting unit 4 and the second guiding unit 43. After using the apparatus, the cutting unit 4 and the second guiding unit 43 can be removed altogether from the casing 1 for cleaning purposes by removing the cap 14 and by detaching the mounting frame 46 from the side walls 12. The cutting rollers 41 can be replaced with a new set of cutting rollers when noodles with a different width are to be made.

An elongated guiding member 45 with an inverted V-shaped cross-section is disposed between the rolling unit 3 and the cutting unit 4. The guiding member 45 has a first inclined wall which inclines forwardly and downwardly and which has an inclined guiding face 453 for guiding the flat piece of dough downwardly from a bottom side of the rolling unit 3 to pass between the cutting rollers 41, and a second inclined wall that inclines downwardly and rearwardly from upper edge of the first inclined wall. The first inclined wall has a lower edge formed with a pair of engaging projections 452 that extend through the engaging holes 422 in the rear one of the lower cover plates 42. The second inclined wall has a lower edge 451 that extends into the elongated groove 421.

Accordingly, the apparatus of the prevent invention permits making of noodles in a continuous manner without the need for replacing a rolling unit with a cutting unit during the noodle making process. In addition, the adjustment unit provided in the apparatus of the present invention permits infinite adjustment of the thickness of the flat piece of dough within a limited range to suit the needs of the user, and is capable of retaining the rollers 32, 31 at the adjusted distance.

With this invention thus explained, it is apparent that numerous modifications and variations can be made without departing from the scope and spirit of this invention. It is therefore intended that this invention be limited only as indicated in the appended claims.

I claim:

1. An apparatus for making noodles, comprising a casing, a rolling unit mounted on said casing for flattening a mass of dough into a flat piece of dough, a cutting unit mounted on said casing and disposed below said rolling unit for cutting the flat piece of dough into strands of noodles, a drive unit for driving operably said rolling unit and said cutting unit, and a guiding unit disposed between said rolling unit and said cutting unit for guiding the flat piece of dough into said cutting unit;

said casing being formed with an opening between said cutting unit and said rolling unit such that the flat piece of dough can be pulled out of said casing via said opening without passing through said cutting unit;

said rolling unit including: a cylindrical first roller; a cylindrical second roller parallel to and spaced apart from said first roller, said first and second rollers permitting passage of the mass of dough therebetween; a first shaft connected fixedly and coaxially to said first roller, said first shaft being coupled to and being driven rotatably by said drive unit; a second shaft extending axially and rotatably through said second roller; a drive gear coupled to said first shaft; a follower gear coupled to said second roller and engaging said drive gear, thereby permitting simultaneous rotation of said first and second rollers in opposite directions; and an adjustment unit for adjusting distance between said first and second shafts, said adjustment unit including an eccentric pin fixed to said second shaft and extending axially and eccentrically from one end of said second shaft, a rotary knob disposed outwardly of said casing and secured to said eccentric pin, said rotary knob being operable for rotating said eccentric pin, and a ratchet and pawl unit mounted on said casing and coupled to said eccentric pin, said ratchet and pawl unit permitting rotation of said eccentric pin in a first direction so as to move said second roller toward and away from said first roller for adjusting the distance between said first and second shafts, said ratchet and pawl unit preventing rotation of said eccentric pin in a second direction opposite to the first direction so as to retain said second shaft at the adjusted distance from said first shaft;

said cutting unit including a parallel pair of cutting rollers formed with alternate annular protrusions and annular grooves.

2. The apparatus according to claim 1, wherein said ratchet and pawl unit includes a stationary seat secured to said casing and formed with a plurality of ratchet teeth, and a rotary seat coupled non-rotatably to said eccentric pin and formed with a pawl member, said pawl member sliding past said ratchet teeth when said rotary seat is rotated in the first direction relative to said stationary seat, thereby permitting rotation of said eccentric pin in the first direction, said pawl member engaging said ratchet teeth when said rotary seat is rotated in the second direction, thereby preventing rotation of said eccentric pin in the second direction.

3. The apparatus according to claim 2, wherein said eccentric pin has a non-circular cross-section, said rotary seat being formed with a non-circular central hole to permit extension of said eccentric pin therethrough for coupling non-rotatably with said eccentric pin.

4. The apparatus according to claim 2, wherein said stationary seat is annular in shape and has an inner peripheral surface that confines a central opening and that is formed with said ratchet teeth, said rotary seat extending into said central opening and having an outer periphery surrounded by said inner peripheral surface of said rotary seat, said pawl member being provided at said outer periphery of said rotary seat, said rotary seat being provided with a biasing member which extends in a radial direction for biasing said pawl member radially outward to engage releasably said ratchet teeth.

5. The apparatus according to claim 1, wherein said guiding unit includes a support frame mounted on said casing, and two guiding plates that extend upwardly and respectively to lower ends of said first and second rollers in order to guide the flat piece of dough downwardly and to prevent sticking of the flat piece of dough onto either of said first and second rollers.

6. The apparatus according to claim 5, wherein said casing has two upright side walls, said rolling unit and said cutting unit being disposed between and being mounted on said side walls, said support frame having two spaced-apart inclined vertical walls which incline downwardly in a direction toward each other and which have confronting sides formed with engaging grooves, each of said side walls having a flat projection which extends between said vertical walls and which is formed with engaging protrusions for engaging resiliently said engaging grooves of said support frame.

7. The apparatus according to claim 1, wherein said guiding unit includes a guiding member having an inclined guiding face for guiding the flat piece of dough to pass between said cutting rollers.

8. The apparatus according to claim 1, further comprising a second guiding unit including a parallel pair of horizontal rails which are disposed immediately and respectively below said cutting rollers, each of said horizontal rails being formed with a plurality of guiding plates that extend upwardly and respectively into said annular grooves of a respective one of said cutting rollers to guide the noodles downwardly and to prevent sticking of the noodles onto either of said cutting rollers.

9. The apparatus according to claim 1, further comprising a pair of cover plates disposed above said cutting rollers for covering upper sides of said cutting rollers.

10. The apparatus according to claim 9, wherein each of said cover plates has an inverted V-shaped cross-section.

11. The apparatus according to claim 1, further comprising a pair of cover plates disposed above said first and second rollers, respectively, for covering upper sides of said first and second rollers.

12. The apparatus according to claim 11, wherein each of said cover plates has an inverted V-shaped cross-section.

13. The apparatus according to claim 1, further comprising a noodle receiver disposed below said cutting unit for receiving the strands of noodles from said cutting unit.

\* \* \* \* \*

UNITED STATES PATENT AND TRADEMARK OFFICE
CERTIFICATE OF CORRECTION

PATENT NO. : 6,003,437
DATED : December 21, 1999
INVENTOR(S) : Y.-K. Lu

It is certified that error appears in the above-identified patent and that said Letters Patent is hereby corrected as shown below:

COLUMN  LINE 6  54  after "including" insert --:--
(Claim 1, line 27)

6  55  the final four subclauses of Claim 1 should be double-
through  indented, beginning with the paragraph that starts "an
7  7  eccentric pin fixed..." and running to the end of the
(Claim 1, line 27)  claim.

Signed and Sealed this

Second Day of January, 2001

Attest:

Q. TODD DICKINSON

*Attesting Officer*  *Commissioner of Patents and Trademarks*